(12) United States Patent
Hayes et al.

(10) Patent No.: US 9,736,145 B1
(45) Date of Patent: Aug. 15, 2017

(54) GENERATION AND VALIDATION OF DERIVED CREDENTIALS

(71) Applicant: SecureAuth Corporation, Irvine, CA (US)

(72) Inventors: Chris Hayes, Danielson, CT (US); Garret Florian Grajek, Aliso Viejo, CA (US); Jeffrey Chiwai Lo, Irvine, CA (US); Allen Yu Quach, Rosemead, CA (US); Firas Shbeeb, Tustin, CA (US)

(73) Assignee: SecureAuth Corporation, Irvine, CA (US)

( * ) Notice: Subject to any disclaimer, the term of this patent is extended or adjusted under 35 U.S.C. 154(b) by 20 days.

(21) Appl. No.: 14/815,699

(22) Filed: Jul. 31, 2015

Related U.S. Application Data

(60) Provisional application No. 62/032,483, filed on Aug. 1, 2014.

(51) Int. Cl.
| | |
|---|---|
| *G06F 21/00* | (2013.01) |
| *H04L 29/06* | (2006.01) |
| *H04L 9/32* | (2006.01) |
| *G06F 21/33* | (2013.01) |
| *G06F 21/41* | (2013.01) |

(52) U.S. Cl.
CPC .......... *H04L 63/0823* (2013.01); *G06F 21/33* (2013.01); *G06F 21/41* (2013.01); *H04L 9/3228* (2013.01); *H04L 9/3265* (2013.01); *H04L 9/3268* (2013.01); *H04L 63/0838* (2013.01); *H04L 63/0846* (2013.01)

(58) Field of Classification Search
CPC .......... G06F 21/30; G06F 21/31; G06F 21/33; G06F 21/34; G06F 21/41
See application file for complete search history.

(56) References Cited

U.S. PATENT DOCUMENTS

| | | | | |
|---|---|---|---|---|
| 2009/0132813 | A1* | 5/2009 | Schibuk | G06Q 20/223 713/158 |
| 2015/0244711 | A1* | 8/2015 | Venkataraman | H04L 63/0823 713/156 |

* cited by examiner

*Primary Examiner* — Edward Zee
(74) *Attorney, Agent, or Firm* — Knobbe Martens Olson & Bear LLP

(57) ABSTRACT

A CAC/PIV certificate associated with a HSPD-12 identity is used to generate a derived credential for storage on a device, such as a mobile device, that lacks a CAC/PIV card reader. The derived credential (which is distinct from the original CAC/PIV certificate) may then be used to grant the device access to secure resources that may otherwise require a CAC/PIV certificate. Embodiments of the present disclosure also relate to systems and methods for authenticating or validating a derived credential stored on a mobile device.

20 Claims, 6 Drawing Sheets

GENERATION AND VALIDATION OF DERIVED CREDENTIALS

CROSS-REFERENCE TO RELATED APPLICATIONS

This application claims the benefit of U.S. Provisional Application No. 62/032,483, filed Aug. 1, 2014, which is incorporated herein by reference in its entirety. Any and all applications, if any, for which a foreign or domestic priority claim is identified in the Application Data Sheet of the present application are hereby incorporated by reference under 37 CFR 1.57.

BACKGROUND

Under Homeland Security Presidential Directive 12 ("HSPD-12") the U.S. Government has issued Common Access Cards or Personal Identity Verification (CAC/PIV) cards to federal employees, contractors, and service personnel for the purposes of verifying an individual's identity and providing secure access. An individual may authenticate their CAC/PIV card to obtain access to secure or protected web resources. The CAC/PIV cards are X.509 certificate based cards that are strongly resistant to identity fraud, tampering, counterfeiting, and terrorist exploitation. The cards may be issued by providers whose reliability has been established through an official accreditation process.

SUMMARY

For a user who was issued a CAC/PIV card to obtain access to a secure web resource, the user may be required to insert their CAC/PIV card into a CAC/PIV card reader attached to a device, such as computer terminal or a mobile device. After the CAC/PIV card is authenticated, the user may then be able to access the web resource. However, the user may desire to access the web resource using a device without an attached CAC/PIV card reader. For example, the user may desire to access the web resource using a variety of mobile devices: cell phones, smart phones, tablets, laptops, netbooks, Chromebooks, and so forth. Thus, there is a need for access to secure resources to be provided to devices (e.g., mobile devices) that do not support CAC/PIV credential readers or any other specialized card readers. The secure resources may include any local, enterprise, or cloud resource (for example, any web, network, mobile, or cloud resource).

One way of doing this is to provide "CAC/P1V-like" credentials to the device. Such derived credentials may allow a mobile device to access secure resources that require CAC/PIV authentication, without actually using the CAC/PIV card. The mobile device may be able to access the secure resource without requiring rooting of the device or any special user configurations, and the user may be able to stay within the web browser while providing derived credentials and accessing the secure resource. Embodiments of this disclosure relate to systems and methods capable of establishing and validating derived credentials.

The systems and methods described herein each have several aspects, no single one of which is solely responsible for its desirable attributes. Without limiting the scope of this disclosure, several non-limiting features will now be discussed briefly.

Note, although the system may comprise a prebuilt appliance or server with hardware processors, the system may also, in some embodiments, comprise a virtual appliance (such as a VMWare image that can be used to emulate an appliance on any standard computing system that supports virtual images). For more information and background on other configurations, features, functions, and options of the appliance and/or client devices, see U.S. Pat. Nos. 8,327,142, 8,301,877, 8,707,031, 8,613,067, 8,510,816, 8,769,651, and U.S. Provisional Patent Application 61/941,286, filed Feb. 18, 2014, each of which are incorporated herein by reference in their entirety for all purposes.

In some embodiments, the system is a computing appliance for providing a derived credential to a target device. The system comprises: one or more processors; a computer-readable memory; and an authentication program comprising executable instructions stored in the computer-readable memory. The executing instructions direct the one or more processors to at least: receive a request, over a computer network, for generating a derived credential from a CAC/PIV enabled device; receive a CAC/PIV certificate associated with a user over the computer network from the CAC/PIV enabled device, the CAC/PIV certificate comprising a first public key and a user identifier associated with the user; authenticate the user by validating the CAC/PIV certificate against a certificate chain and a revocation list; store the CAC/PIV certificate, or a public key associated with the CAC/PIV certificate, in an enterprise data store as associated with the user's entry in the enterprise data store, the enterprise data store comprising identity information for users associated with an enterprise; issue to the user a passcode over the computer network, wherein the passcode is associated with the CAC/PIV certificate or the user, and wherein the passcode is a one-time-use passcode or a time limited passcode; receive the passcode from a target device, the target device being distinct from the CAC/PIV enabled device, the target device not having a CAC/PIV card reader; verify the passcode as associated with the CAC/PIV certificate or the user; generate a second private key and a corresponding second public key, the second public key distinct from the first public key; associate the second public key with the user identifier in the CAC/PIV certificate; associate the second public key with the expiration date of the CAC/PIV certificate; generate a certificate signing request based on the second public key and associated data; submit the certificate signing request to a certificate authority; receive from the certificate authority a signed derived credential certificate for the user identifier with an expiration date equal to the expiration date of the CAC/PIV certificate; and transmit to the target device the derived credential certificate for storage by the target device and future derived credential-based authentication. According to some embodiments, the signed derived credential certificate is a signed X.509 certificate. According to some embodiments, the target device is configured to store the derived credential certificate in a trusted platform module of the target device. According to some embodiments, the passcode is a one-time-use passcode, and verifying the passcode comprises checking that the passcode has not been received before. According to some embodiments, the passcode is a time limited passcode, and verifying the passcode comprises checking that the passcode was received within a time limit associated with the passcode.

In some embodiments, the method is a computerized method for providing a derived credential to a target device. The method comprises, by one or more hardware processors executing computing instructions: receiving a request, over a computer network, for generating a derived credential from a CAC/PIV enabled device; receiving a CAC/PIV certificate associated with a user over the computer network from the CAC/PIV enabled device, the CAC/PIV certificate comprising a first public key and a user identifier associated with the user; authenticating the user by validating the CAC/PIV certificate against a certificate chain and a revocation list; storing the CAC/PIV certificate, or a public key associated with the CAC/PIV certificate, in an enterprise data store as associated with the user's entry in the enterprise data store, the enterprise data store comprising identity information for users associated with an enterprise; issuing to the user a passcode over the computer network, wherein the passcode is associated with the CAC/PIV certificate or the user, and wherein the passcode is a one-time-use passcode or a time limited passcode; receiving the passcode from a target device, the target device being distinct from the CAC/PIV enabled device, the target device not having a CAC/PIV card reader; verifying the passcode as associated with the CAC/PIV certificate or the user; generating a second private key and a corresponding second public key, the second public key distinct from the first public key; associating the second public key with the user identifier in the CAC/PIV certificate; associating the second public key with the expiration date of the CAC/PIV certificate; generating a certificate signing request based on the second public key and associated data; submitting the certificate signing request to a certificate authority; receive from the certificate authority a signed derived credential certificate for the user identifier with an expiration date equal to the expiration date of the CAC/PIV certificate; and transmitting to the target device the derived credential certificate for storage by the target device and future derived credential-based authentication. According to some embodiments, the signed derived credential certificated is a signed X.509 certificate. According to some embodiments, the target is configured to store the derived credential certificate in a trusted platform module of the target device. According to some embodiments, the passcode is a one-time-use passcode, and verifying the passcode comprises checking that the passcode has not been received before. According to some embodiments, the passcode is a time limited passcode, and verifying the passcode comprises checking that the passcode was received within a time limit associated with the passcode.

In some embodiments, the system is a computing appliance for validation of a derived credential. The system comprises: one or more processors; a computer-readable memory; and an authentication program comprising executable instructions stored in the computer-readable memory. The executable instructions direct the one or more processors to at least: receive an authentication request from a computing device, the computing device not enabled to read a CAC/PIV card; receive a derived credential certificate from the computing device; validate the derived credential certificate based on a trusted certificate chain and a certificate authority signature; validate that the derived credential certificate has not expired; validate that the derived credential certificate has not been revoked; verify that a user identifier associated with the common name of the derived credential exists in an enterprise data store; retrieve a CAC/PIV certificate from the enterprise data store that is associated with the user identifier, the CAC/PIV certificate distinct from the derived credential certificate; verify that the CAC/PIV certificate has not been revoked; and in response to successful verification of the CAC/PIV certificate and derived credential certificate, issue a single-sign-on token to the computing device that can be used to access a network resource. According to some embodiments, the derived credential certificate is a signed X.509 certificate. According to some embodiments, validating that the derived credential certificate has not been revoked comprises checking a certificate revocation list. According to some embodiments, the enterprise data store comprises an active directory, a SQL database, an Oracle database, or a mySQL database. According to some embodiments, the executable instructions further comprise requesting the computing device to provide one or more additional authentication factors associated with the common name of the derived credential.

In some embodiments, the method is a computerized method for validation of a derived credential. The method comprises, by one or more hardware processors executing computing instructions: receiving an authentication request from a computing device, the computing device not enabled to read a CAC/PIV card; receiving a derived credential certificate from the computing device; validating the derived credential certificate based on a trusted certificate chain and a certificate authority signature; validating that the derived credential certificate has not expired; validating that the derived credential certificate has not been revoked; verifying that a user identifier associated with the common name of the derived credential exists in an enterprise data store; retrieving a CAC/PIV certificate from the enterprise data store that is associated with the user identifier, the CAC/PIV certificate distinct from the derived credential certificate; verifying that the CAC/PIV certificate has not been revoked; and in response to successful verification of the CAC/PIV certificate and derived credential certificate, issuing a single-sign-on token to the computing device that can be used to access a network resource. According to some embodiments, the derived credential certificate is a signed X.509 certificate. According to some embodiments, validating that the derived credential certificate has not been revoked comprises checking a certificate revocation list. According to some embodiments, the enterprise data store comprises an active directory, a SQL database, an Oracle database, or a mySQL database. According to some embodiments, the method further comprises requesting the computing device to provide one or more additional authentication factors associated with the common name of the derived credential.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION OF PREFERRED EMBODIMENTS

Figure 1:
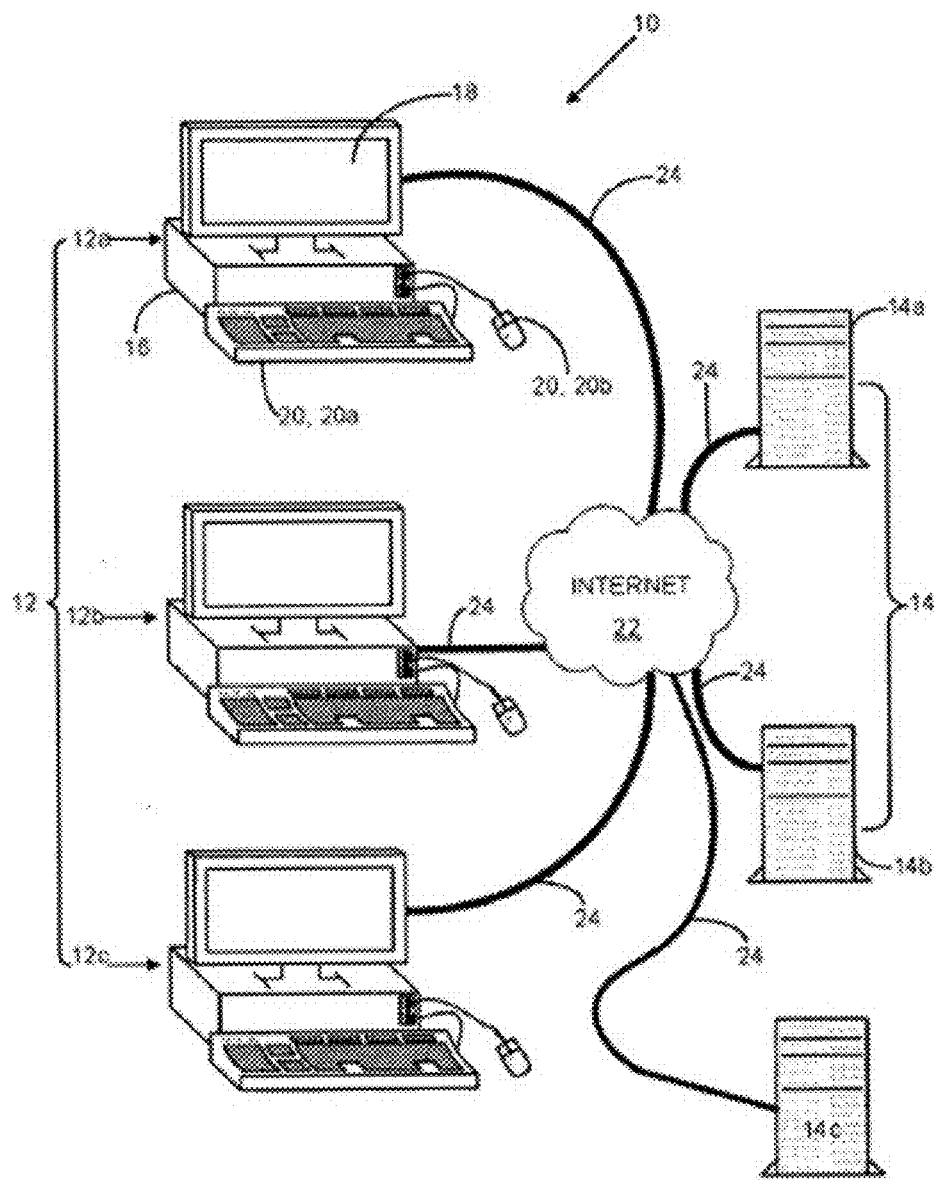
FIG. 1 is a block diagram illustrating an example environment in which one embodiment may be implemented, including various interconnected servers, clients, and networks.

Although certain preferred embodiments and examples are disclosed below, the inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Terms

To facilitate an understanding of the systems and methods discussed herein, a number of terms are defined below. The terms defined below, as well as other terms used herein, should be construed broadly to include, without limitation, the provided definitions, the ordinary and customary meanings of the terms, and/or any other implied meanings for the respective terms. Thus, the definitions below do not limit the meaning of these terms, but only provide example definitions.

Database or Data Store:

A broad term for any data structure for storing and/or organizing data, including, but not limited to, relational databases (for example, Oracle database, SQL database, mySQL database, and the like), an active directory/LDAP directory, spreadsheets, XML files, and text files, among others. The various terms "database," "data store," and "data source" may be used interchangeably in the present disclosure.

CAC/PIV:

This is a broad term used to refer to any smart card that may be used for identification or authentication. The card may have an embedded microchip and one or more certificates. It may be used to identify the user, and the certificate may include a private key used for asymmetric cryptography. The smart card may be a Common Access Card (CAC), which is a X.509 certificate-based smart card used for identification for military or service personnel, U.S. Department of Defense civilian employees, and eligible contractor personnel. The smart card may be a personal identity verification (PIV) card, which is used by personnel in U.S. federal agencies.

Certificate or Credential:

A broad term for any digital certificate employed in the context of digital message signing and authentication over a network. Digital certificates are widely used for https web sites, where a web browser validates that an SSL/TLS web server is authentic. Digital certificates may be issued by different certificate authorities, but in a form that is compatible in a context of encryption and decryption on a global communications network, such as the Internet. It may contain a public key associated with a user. Software may be used to check and certify the public key based on a standard protocol.

Private Key:

A privately-known key in a public/private key pair, which is used during authentication to ensure the validity of a user. The key may be used to digitally sign an authentication request. An authentication server may send a message to a client, and the client may validate the identity of the user by signing the message with the user's private key. The message may be a digitally hashed message, and the client may run the hash and sign it with the private key. The server may utilize the same hashing algorithm and the resulting current hash value may be stored for later comparison. The server may take the digitally signed signature from the client and decrypt the hash value with the user's public key. The decrypted hash value may be compared with the current hash value, and a match may result in a successful verification.

Public Key:

A publicly-known key in a public/private key pair, which is used during authentication to ensure the validity of a user. The key may be used to decrypt a message or value signed with a private key.

X.509:

A term referring to the X.509 standard for digital certificates, which was originally part of a "X.500" series of standards. It has been extended to embrace a wide variety of Internet services such as e-mail, worldwide web protocols, user authentication, and electronic commerce. X.509 may also serve as a standard for a public key infrastructure (PKI) and Privilege Management Infrastructure (PMI), and it may also specify the standard formats for public key certificates, certificate revocation lists, attribute certificates, and a certification path validation algorithm. X.509 certificates require the use of certificate authorities and a public key infrastructure to verify the relationship between a certificate and its owner.

SSL/TLS:

A cryptographic protocol designed to provide communications security over a computer network. It may refer to Secure Sockets Layer (SSL) and its successor, Transport Layer Security (TLS), which use X.509 certificates and asymmetric cryptography to authenticate the identity of counterparties.

Certificate Authority (CA):

A party, typically a trusted third-party, which is responsible for checking each purported owner's claim to the published public key. (i.e., requiring some proof of identification of persons publishing and posting public keys for purposes of encryption on the Internet). The certification authority then adds its digital signature to the public key and this, in effect, validates the public key.

In a typical scenario, a web site operator may obtain a certificate by applying to a CA with a certificate signing request. The certificate signing request is an electronic document that may contain the website name, a contact email address, and company information. The CA signs the request producing a public certificate. The public certificate is delivered to the web browser that establishes a connection between the client device and the website. The certificate proves to the web browser that the CA both trusted and issued a certificate to the owner of the website. Thus, CA's are guarantors of the authenticity and security of online transactions that issue digital certificates, or encrypted electronic packages carrying information that authenticates its sender.

Revocation List (CRL):

A list of certificates or serial numbers of certificates that have been revoked (for example, revoked prior to expiration of the certificate). Entities pertaining to those revoked certificates should no longer be trusted. A revocation list is used in the operation of some cryptosystems, usually public key infrastructures (PKIs) such as the one specified under the X.509 standard.

Derived Credential:

A credential or certificate that is distinct from a CAC/PIV credential. It may be stored on a mobile device. It may be in various formats, such as a new X.509 certificate, a public/private key pair, an encrypted token or cookie, and so forth. In particular, a derived credential may be an X.509v3 certificate that is mapped to a HSPD-12 identity and stored on a mobile device, for use in providing access to a secure resource on the mobile device.

Certificate Chain:

A chain of trust for verifying digital certificates, which may be an ordered list of all certificates needed to certify the individual to which the end certificate was issued. The list may contain the end certificate, the certificates of intermediate CAs, and the certificate of a root CA trusted by all parties in the chain (a trust anchor). Verifying a newly-received certificate against the certificate chain may involve checking all of the certificates in the certificate chain, from the trust anchor all the way down to the newly-received end certificate. The newly-received end certificate may be trusted only if each certificate in the certificate chain is found to be properly issued and valid.

DESCRIPTION OF THE FIGURES

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure described above and/or below may include several novel features, no single one of which is solely responsible for its desirable attributes or which is essential to practicing the embodiments of the disclosure herein described.

I. Example Implementation Environment

With reference to FIG. 1, an exemplary computer network 10 includes various data processing apparatuses or computers 12, 14. More particularly, the computers 12 may be personal computers or workstations that function as client devices, and include a system unit 16 that houses a central processing unit, storage devices, and the like. The computers 12 may also include a display unit 18, and input devices 20 such as a keyboard 20a and a mouse 20b. Computers 12 may have a special CAC/PIV card reader. A user may be able to insert a CAC/PIV card into computers 12 (e.g., via respective card reader slots), which may be configured to read and access a CAC/PIV certificate associated with the CAC/PIV card.

It is understood that the system unit 16 receives various inputs from the input devices 20 that alter the control and flow of preprogrammed instructions being executed by the central processing unit, and the results of such execution are shown on the display unit 18. In one embodiment of the present invention the client computers 12 also referred to as client devices 12 or computing devices 12, may also include, for example, a mobile phone or other portable electronic device.

The computers 14 may be servers that provide data or services to the client computers 12. In this regard, the term "client" is understood to refer to the role of the computers 12 as a requestor of data or services, while the term "server" is understood to refer to the role of the servers 14 to provide such data or services. Additionally, it is possible that a computer 12 may request data or services in one transaction and provide data or services in a different transaction, thus changing its role from client to server or vice versa. It is further understood that the term "server" as utilized herein may also refer generally to networked services such as a Secure Sockets Layer/Transport Layer Security (SSL/TLS) Virtual Private Network (VPN), through which conventional servers 14 provide data and applications to remote clients.

The computers 12, 14 are connected to a wide area network such as the Internet 22 via network connections 24. Requests from the client computers 12 and requested data from the server computers 14 are delivered through the network connections 24. According to an embodiment of the present invention, the server computers 14 are web servers, and the client computers 12 include web browsing applications such as Microsoft Internet Explorer that visually render documents provided by the server computers 14 on the display units 18. It will be appreciated that the network topology shown in FIG. 1 is presented by way of example only and not of limitation, and any other type of local and/or wide area network may be readily substituted without departing from the scope of the present disclosure. It is understood that any well-known data transmission protocol may be utilized for the network connections 24 and the Internet 22.

Each server 14 may be similar to the identity provider 216 in FIGS. 2 and 3 (described below), or it may be the server that performs the authentication appliance 408 in FIG. 4 or the authentication appliance 508 in FIG. 5. Server 14 may deploy software capable of taking the CAC/PIV certificate and generating a derived credential certificate. Server 14 may deploy software capable of taking a derived credential certificate, authenticating it, and providing access to a secure resource.

In one embodiment of the present invention, each server 14 is a web server, an online enterprise, or a hosting service. The server 14 may execute a certificate generation and processing component. A user may access the certificate generation and processing component in order to generate a derived credential certificate, or authenticate a derived credential certificate in order to obtain access to a secure resource.

In some embodiments, the certificate generation and processing component is a plug-in software component, such as a web plug-in, installed on the server 14. Another aspect of the present invention contemplates the server component being downloadable onto the server 14 via the network connection 24. The certificate generation and processing functionality may alternatively be implemented in a standalone device interfacing with the server 14.

II. Example Derived Credential Environment

Figure 2:
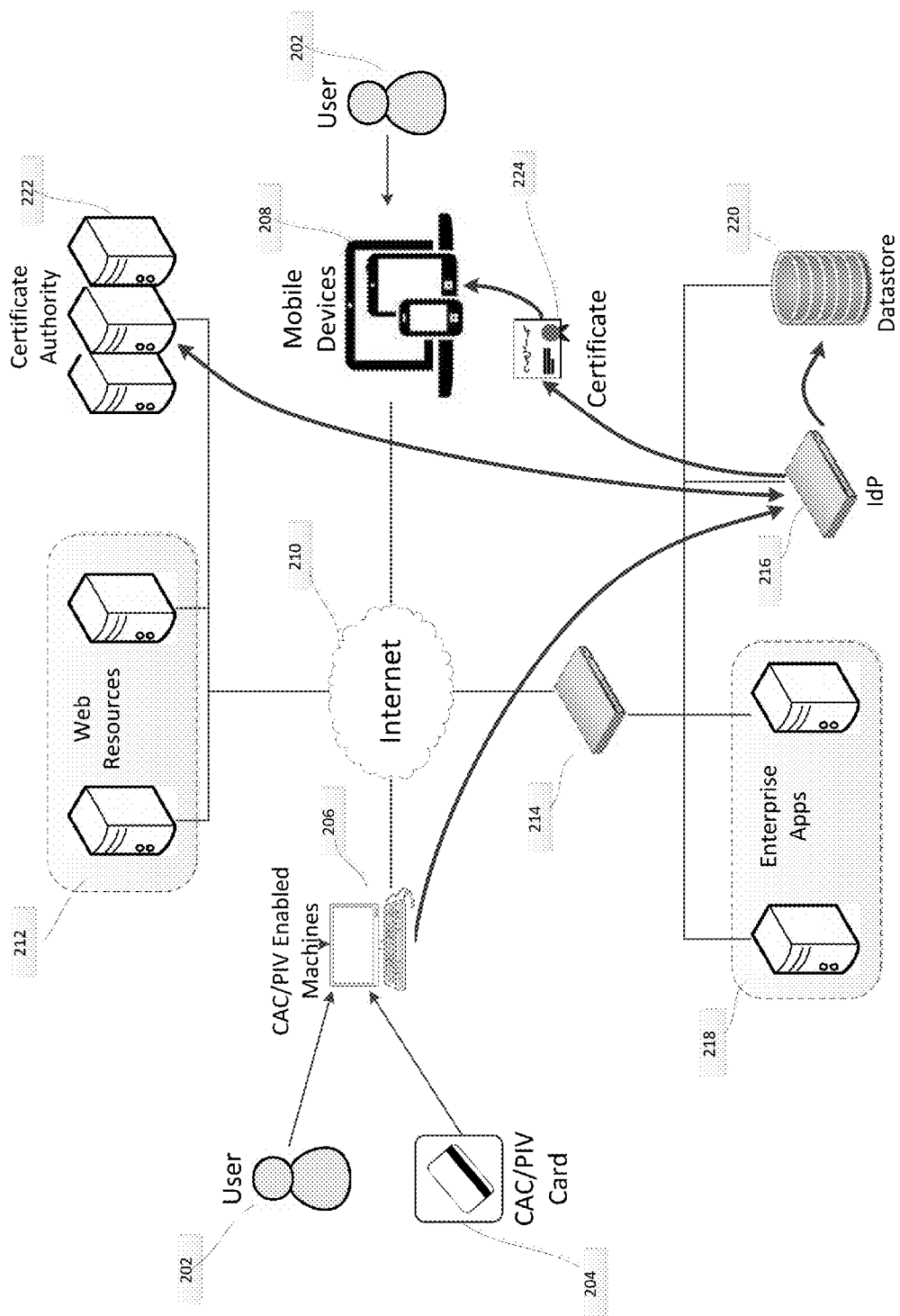
FIG. 2 is a block diagram illustrating an example environment in which one aspect of derived credential generation may be implemented, according to an embodiment.

FIG. 2 is a block diagram illustrating an example derived credential generation environment, according to an embodiment of the present disclosure.

User 202 may access a CAC/PIV-enabled machine 206 and insert a CAC/PIV card 204 into the machine. The CAC/PIV-enabled machine 206 may read/access a CAC/PIV certificate or credential associated with CAC/PIV card 204 and user 202. The same user 202 may have one or more mobile devices 208, on which access to one or more secure resources is desired. For example, the secure resources may be web resources 212 or enterprise apps 218. The CAC/PIV enabled machine 206 may access, through internet 210 and in some instances a router/firewall 214, an identity provider 216. The identity provider 216 may be a source for validating user identity in a federated identity system. The CAC/PIV enabled machine 206 may provide the identity provider 216 with the CAC/PIV certificate.

The identity provider 216 may store the CAC/PIV certificate or its attributes in data store 220. The identity provider 216 may use the CAC/PIV certificate and communicate with certificate authority 222 in order to generate a derived credential. The derived credential may be a certificate, such as derived credential certificate 224. The derived credential certificate 224 may be sent to mobile device 208 to be stored and later used in the process for accessing a secure resource on that mobile device.

Figure 3:
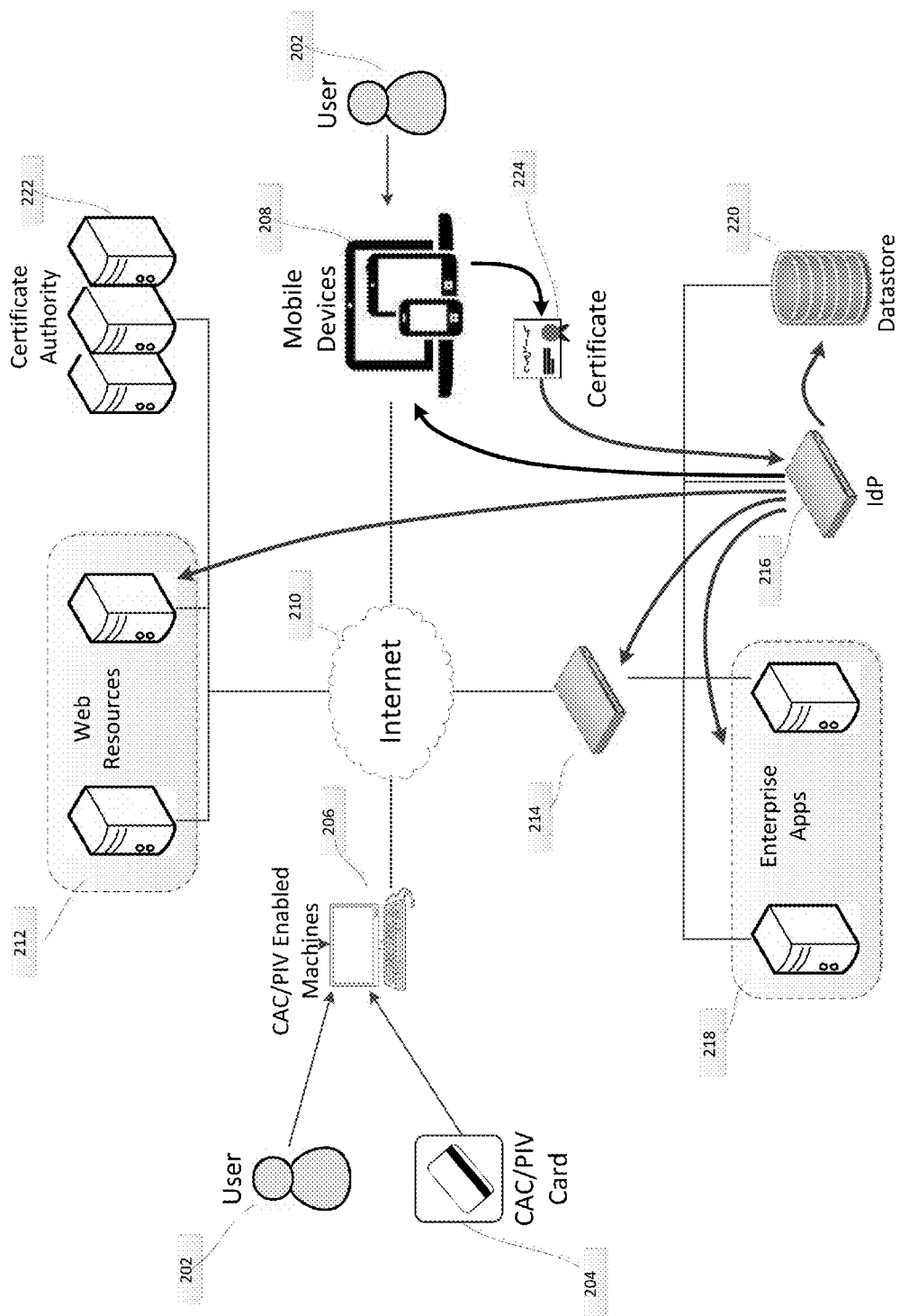
FIG. 3 is a block diagram illustrating an example environment in which one aspect of derived credential authentication may be implemented, according to an embodiment.

FIG. 3 is a block diagram illustrating another example environment in which one aspect of derived credential authentication may be implemented, according to an embodiment of the present disclosure.

The components in FIG. 3 are the same as the components in FIG. 2. User 202 uses mobile device 208, which now has derived credential certificate 224 stored on it. The user 202 may direct the mobile device 208 to access a secure resource, such as web resources 212 or enterprise apps 218, through the internet 210. The user 202 may then be redirected to the identity provider 216.

Identity provider 216 may direct mobile device 208 to supply the derived credential certificate 224. The identity provider 216 may take the derived credential certificate 224 and validate it. The validation process may involve router/firewall 214. The identity provider 216 may compare attributes of the derived credential certificate 224 to the original CAC/PIV certificate used to generate the derived credential certificate 224, and that original CAC/PIV certificate may be stored in data store 220. The identity provider 216 may be configured to access data store 220 directly.

Upon validating the derived credential certificate 224, the identity provider 216 may provide mobile device 208 with access to web resources 212 or enterprise apps 218. This access may be provided in various ways. For example, one way is providing a single sign-on certificate or password for accessing web resources 212 or enterprise apps 218.

III. Generating Derived Credentials (FIG. 4)

Figure 4:
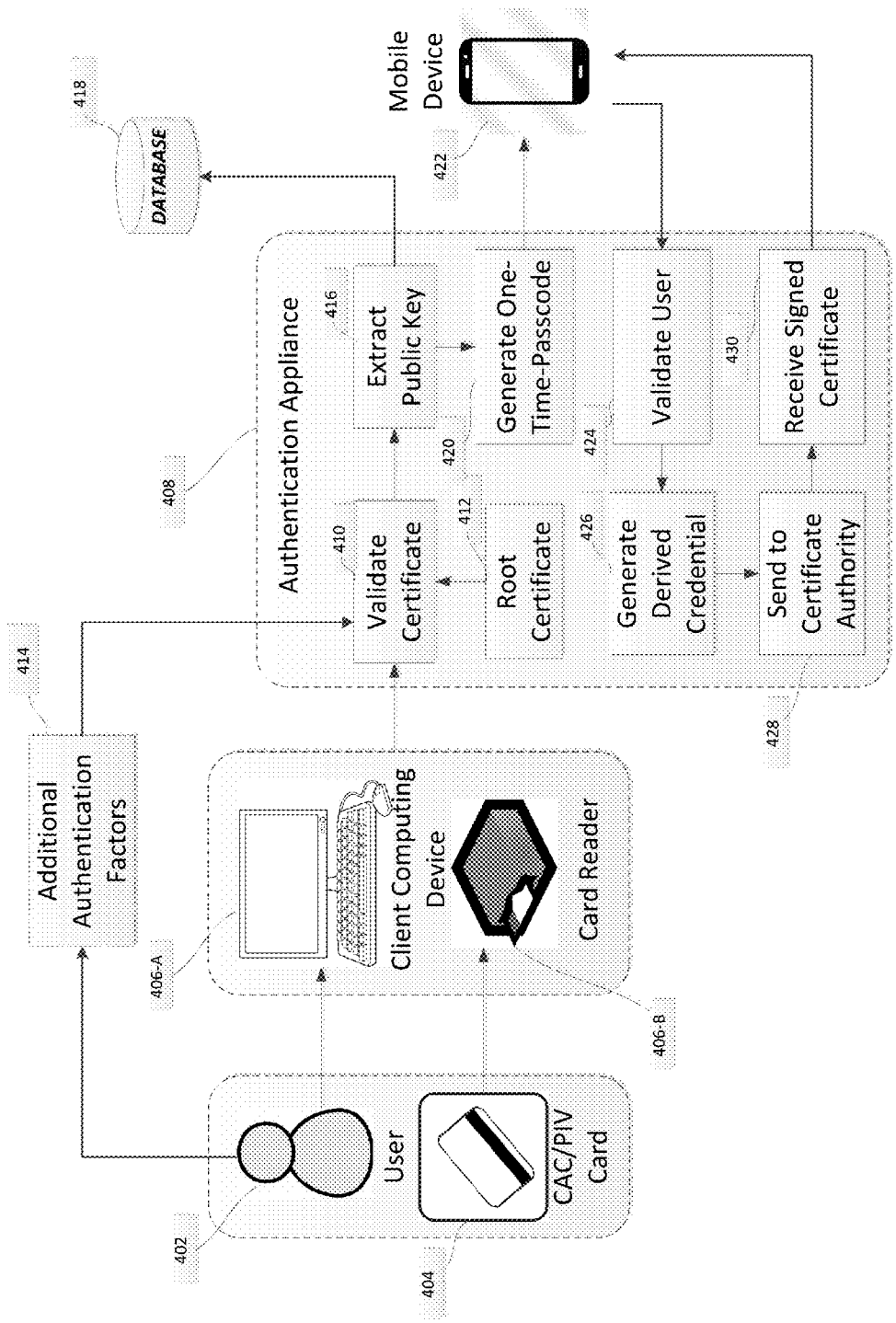
FIG. 4 is a flowchart illustrating an example system of generating a derived credential, according to an embodiment.

FIG. 4 is a flowchart illustrating a system of generating a derived credential, according to an embodiment of the present disclosure.

User 402 is a user that has been issued a CAC/PIV card 404. User 402 may use CAC/PIV card 404 to read and access a CAC/PIV credential or certificate that is associated with user 402. To set up a derived credential on a mobile device for accessing secure web resources, the user 402 may use a client computing device 406-A to authenticate his CAC/PIV card. Client computing device 406-A may be a desktop computer or a kiosk machine that has a HSPD-12 CAC/PIV card reader 406-B. User 402 may insert CAC/PIV card 404 into the card reader 406-B. Client computing device 406-A may be configured to read/send CAC/PIV certificates and access CAC/PIV authentication appliance 408.

The user 402 may then use client computing device 406-A to access authentication appliance 408. Authentication appliance 408 may be web-based and accessible via a web page. Authentication appliance 408 may be configured to conduct a client SSL/TLS authentication, which is an initial authentication by visiting a website—which may be based on one or more factors of authentication in addition to the CAC/PIV certificate and SSL/TLS authentication.

Authentication appliance 408 may be configured to perform an authentication process, such as the example process illustrated in blocks 410, 416, 420, 424, 426, 428, and 430. At block 410 of FIG. 4 the authentication appliance 408 may begin by validating the CAC/PIV certificate. Authentication appliance 408 may validate the "common name" (hereinafter "CN"), also sometimes known as the user name, of the certificate. Authentication appliance 408 may validate the certificate against a trusted root certificate 412. Authentication appliance 408 may also validate the certificate against a certificate chain, expiration date, and/or revocation list. Authentication appliance 408 may also perform additional validation by requesting additional authentication factors 414 from user 402. Examples of additional authentication factors 414 include a password and/or other 2-factor methods, such as Short Message Service ("SMS"), telephony, PINs, and so forth.

If all required validations are successful at block 410 of FIG. 4, then the authentication appliance 408 may perform block 416 by extracting a public key from the CAC/PIV certificate. The public key may be stored in a secure, enterprise-held data store (for example, the active directory/LDAP directory or SQL database, or other enterprise identity store) such as database 418 for later comparison.

At block 420 of FIG. 4, the authentication appliance 408 may generate a one-time-passcode associated with user 402. The one-time-passcode may be displayed on client computing device 406-A, such as by being presented on the screen of a desktop computer or kiosk machine. The one-time-passcode may be a single use passcode. The one-time-passcode may have a configured time out, such that the one-time-passcode is no longer valid after it has not been utilized within a configured time out period.

User 402 may utilize a mobile device 422 to access authentication appliance 408. Mobile device 422 may be a preferred mobile device that user 402 desires to access a secure web resource, but which does not have a CAC/PIV card reader. The mobile device 422 may access authentication appliance 408 through a web browser or a special mobile application. Authentication appliance 408 may further request that user 402 provide their username, the one-time-passcode generated by the authentication appliance 408 at block 420, and/or any other additional authentication factors.

At block 424 of FIG. 4, the authentication appliance 408 validates the user 402 on his mobile device 422 using any information that has been provided by user 402. The one-time-passcode received from the user 402 may be compared with the one-time-passcode generated at block 420, with a successful match resulting in validation. There may be a configured time-out associated with the one-time-passcode, such that a successful match outside the time-out period would not necessarily result in validation. In such a scenario, the user 402 may have to go back and perform the steps necessary to generate a new one-time-passcode and enter it on their mobile device 422 before the time-out period ends in order to validate.

At block 426 of FIG. 4, the authentication appliance 408 generates a derived credential. The derived credential is a distinct credential from the original CAC/PIV certificate. For example, it may be a new X.509 certificate or other public/private key pair, an encrypted token/cookie, and so forth. The derived credential may be generated through various methods, and the derived credential itself may be in various forms. For example, authentication appliance 408 may use any certificate authority to create a certificate as a derived credential. As another example, authentication appliance 408 may generate a new public/private key pair, and create a certificate signing request with a name (for example, the CN) that matches the original CAC/PIV certificate and has the expiration date of the original CAC/PIV certificate.

At block 428, the authentication appliance 408 submits the public key and the certificate signing request (CSR) to a certificate authority for signature and verification. Some examples of certificate authorities include a certificate authority operating on authentication appliance 408, a third party or cloud-based certificate authority, or a well-known certificate authority (for example, Verisign, etc.).

At block 430, a signed certificate may be returned to authentication appliance 408, by the certificate authority. The expiration of this derived credential may match the expiration of the original CAC/PIV certificate. This derived credential may be a signed X.509 certificate. This derived credential may be sent to the target mobile device 422 for storage and future use as a derived credential, to be authenticated in order to gain access to a secure web resource. The derived credential may be placed in the trusted platform module (TPM) of the mobile device 422. The derived credential may be viewed on the mobile device 422.

In some embodiments, the derived credential certificate may be specifically associated or related to the target device (via a device ID or fingerprint of the target device, etc.) Such an association may be stored in the data store or in the derived credential certificate.

IV. Authenticating Derived Credentials (FIGS. 5 and 6)

Figure 5:
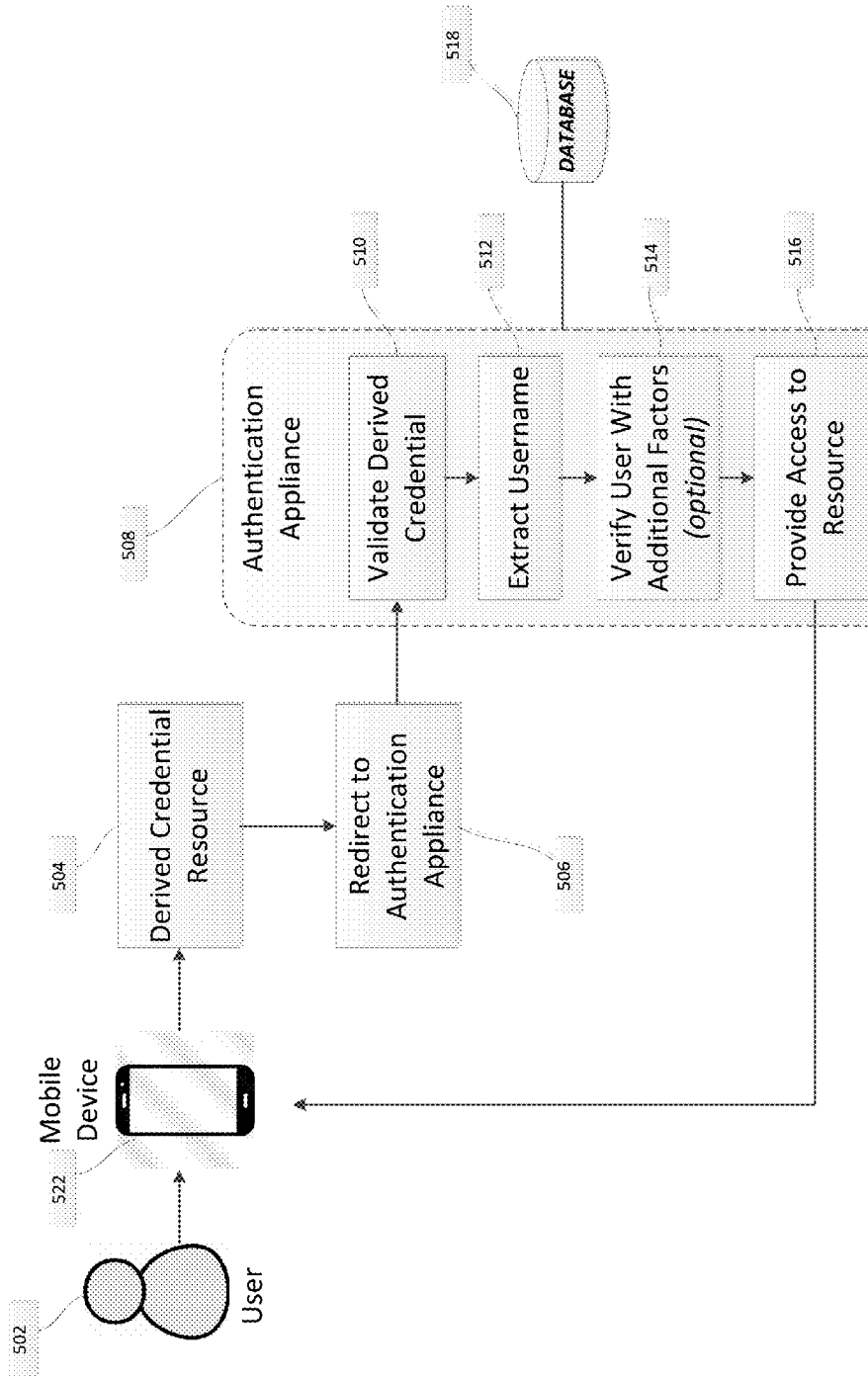
FIG. 5 is a flowchart illustrating an example system of authenticating a derived credential, according to an embodiment.
Figure 6:
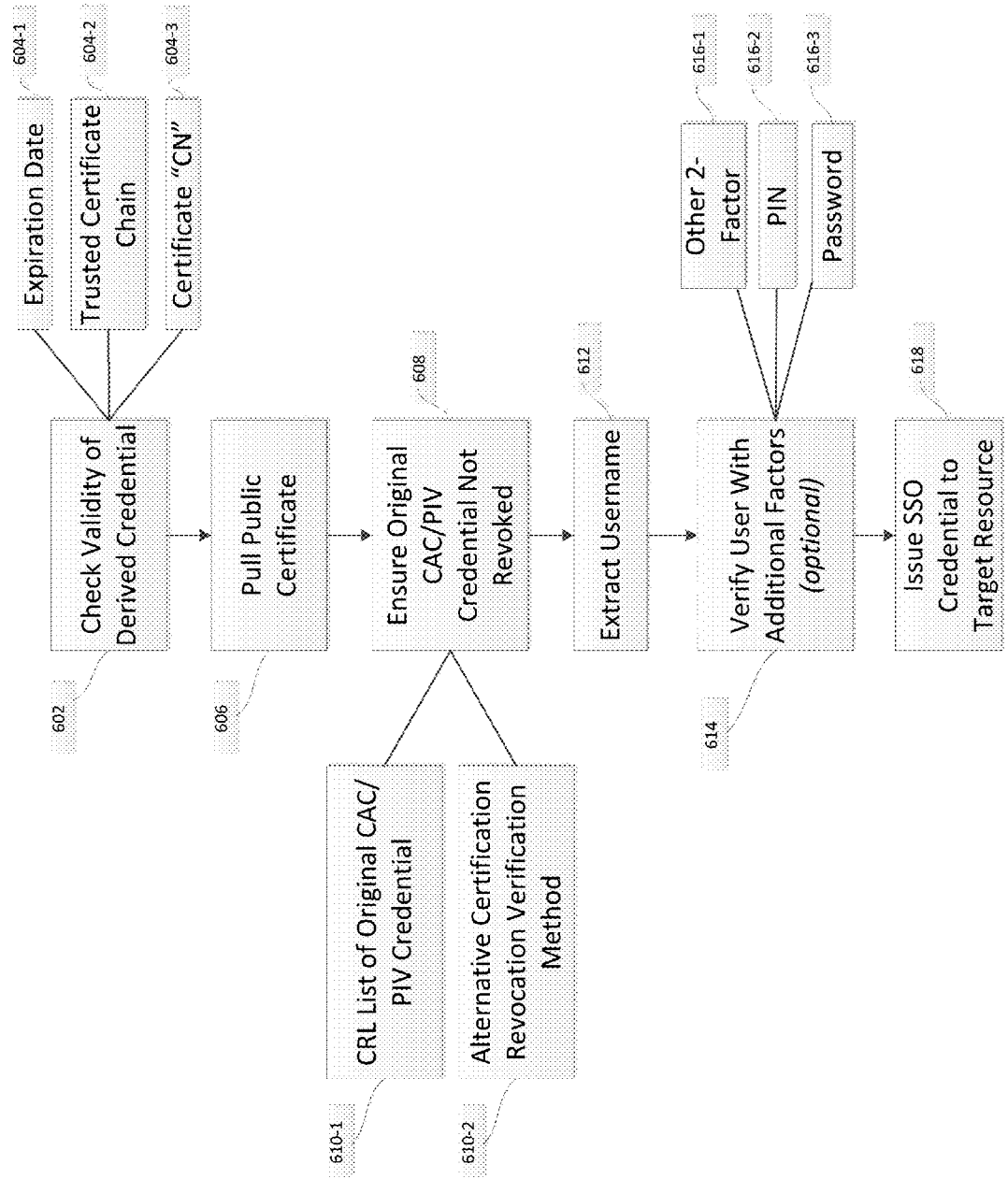
FIG. 6 is a flowchart illustrating the validation of a derived credential, according to an embodiment.

FIG. 5 is a flowchart illustrating an example system and associated process of generating a derived credential, according to an embodiment of the present disclosure.

User 502 may desire to use their mobile device 522 to access a secure web resource. Mobile device 522 may be the same as mobile device 422 from FIG. 4, such that mobile device 522 has a derived credential saved on it.

At block 504, the user 502 may direct their credentialed mobile device 522 to a "derived credential resource," which is any computer resource that may accept a derived credential or requires derived credential authentication. This resource may be protected by an authentication appliance, and thus at block 506 the resource may redirect the user 502 to authentication appliance 508. Authentication appliance 508 may be the same authentication appliance as authentication appliance 408 from FIG. 4, such that the authentication appliance can not only create a derived credential, but it can also validate and conduct an authentication of the derived credential to a local, enterprise, or cloud resource (for example, any web, network, mobile, or cloud resource).

At block 510, authentication appliance 508 checks the validity of the derived credential. A more detailed description of how authentication appliance 508 may check the validity of the derived credential is provided in the discussion of FIG. 6. The validation process may involve comparing attributes of the derived credential against the attributes of the original CAC/PIV certificate, which may have been stored in database 518.

At block 512, once the derived credential has been validated, the authentication appliance 508 extracts the user name or CN from the derived credential. The authentication appliance 508 may request that the user 502 enters additional verification factors to go with the user name, such as a PIN and/or a password, along with other 2-factor authentication mechanisms (e.g., SMS, telephony, PUSH). These additional verification factors may be used to verify the user 502 at optional block 514.

With the derived credential validated and any additional authentication performed, the authentication appliance 508 may then at block 516 provide access to the secure resource to mobile device 522. This access may be provided through various methods. As an example, the authentication appliance 508 may issue a single sign-on (SSO) credential for any target resources, the resources including: Web, Network, Cloud, and Mobile resources. More information about possible SSO schemes which may be implemented in conjunction with the processes described herein can be found in the patents and applications incorporated by reference herein.

FIG. 6 is a flowchart illustrating an example process of validating a derived credential, according to an embodiment of the present disclosure. FIG. 6 may provide further detail about how the authentication appliance 508 in FIG. 5 validates the derived credential at block 510. Thus, the methods in FIG. 6 may be incorporated into the embodiment of the system illustrated by FIG. 5.

At block 602, the system checks the validity of the derived credential on the mobile device. This may be done in various ways. The expiration date 604-1 of the derived credential may be checked. The expiration date 604-1 of the derived credential may be compared to the expiration date of the original CAC/PIV certificate. The trusted certificate chain 604-2 may also be checked. The original CAC/PIV certificate and the certificate for the derived credential may be verified using the trusted certificate chain 604-2. The certificate "CN" 604-3 of the derived credential may also be checked. The certificate "CN" 604-3 of the derived credential may be compared to the "CN" or user name of the original CAC/PIV certificate, which may have been mapped to the enterprise data store.

At block 606, the system pulls the public certificate from the associate enterprise directory. At block 608, the system uses that information to check that the original CAC/PIV credential has not been revoked prior to expiration. The system may do this by checking a certificate revocation list (CRL) of the original CAC/PIV certificate that is stored in the enterprise directory. In some instances, the system may use another certificate revocation verification method, such as the methods described in the patents and applications incorporated by reference herein.

At block 612, the system may extract the username (such as the CN) from the derived credential. At optional block 614, the system may require additional authentication factors from the user to go along with the extracted user name. The user may have to supply a password 616-3, a PIN 616-2, or undergo some other 2-factor 616-1 authentication mechanism, such as via SMS, telephony, or PUSH.

At block 618, the system may issue a single sign-on (SSO) credential that provides access to the target resource. The resource may be a web, network, mobile, or cloud resource, and access may be provided based on the username. In some embodiments, the derived credential certificate may be specifically associated or related to a specific device (via a device ID or fingerprint, etc.).

Implementation & Additional Aspects

Each of the processes, methods, and algorithms described in the preceding sections may be embodied in, and fully or partially automated by, code modules executed by one or more computer systems or computer processors comprising computer hardware. The processes and algorithms may alternatively be implemented partially or wholly in application-specific circuitry. The disclosed processes may be performed under control of software executed by one or more computing devices, each of which may include a processor and memory.

Thus, while the foregoing is directed to various embodiments, other and further embodiments may be devised without departing from the basic scope thereof. For example, aspects of the present disclosure may be implemented in hardware or software or in a combination of hardware and software. An embodiment of the disclosure may be implemented as a program product for use with a computer system. The program(s) of the program product define functions of the embodiments (including the methods described herein) and may be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., hard-disk drive or any type of solid-state random-access semiconductor memory) on which alterable information is stored. Each of the processes, methods, and algorithms described in the preceding sections may be embodied in, and fully or partially automated by, code modules executed by one or more computer systems or computer processors comprising computer hardware. The processes and algorithms may alternatively be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

What is claimed is:

1. A computing appliance for providing a derived credential to a target device, the system comprising:
   one or more processors;
   a computer-readable memory; and
   an authentication program comprising executable instructions stored in the computer-readable memory, wherein the executable instructions direct the one or more processors to at least:
   receive a request, over a computer network, for generating a derived credential from a common access card or personal identity verification (CAC/PIV) enabled device;
   receive a CAC/PIV certificate associated with a user over the computer network from the CAC/PIV enabled device, the CAC/PIV certificate comprising a first public key and a user identifier associated with the user;
   authenticate the user by validating the CAC/PIV certificate against a certificate chain and a revocation list;
   store the CAC/PIV certificate, or a public key associated with the CAC/PIV certificate, in an enterprise data store in an entry associated with the user in the enterprise data store, the enterprise data store comprising identity information for the user and other users associated with an enterprise;
   issue to the user a passcode over the computer network, wherein the passcode is associated with the CAC/PIV certificate or the user, and wherein the passcode is a one-time-use passcode or a time limited passcode;
   receive the passcode from a target device, the target device being distinct from the CAC/PIV enabled device, the target device not having a CAC/PIV card reader;
   verify the passcode as associated with the CAC/PIV certificate or the user;

generate a second private key and a corresponding second public key, the second public key distinct from the first public key;

associate the second public key with the user identifier in the CAC/PIV certificate;

associate the second public key with the expiration date of the CAC/PIV certificate;

generate a certificate signing request based on the second public key and associated data;

submit the certificate signing request to a certificate authority;

receive from the certificate authority a signed derived credential certificate for the user identifier with an expiration date equal to the expiration date of the CAC/PIV certificate; and transmit to the target device the derived credential certificate for storage by the target device and future derived credential-based authentication.

2. The computing appliance of claim 1, wherein the signed derived credential certificate is a signed X.509 certificate.

3. The computing appliance of claim 1, wherein the target device is configured to store the derived credential certificate in a trusted platform module of the target device.

4. The computing appliance of claim 1, wherein the passcode is a one-time-use passcode, and wherein verifying the passcode comprises checking that the passcode has not been received before.

5. The computing appliance of claim 1, wherein the passcode is a time limited passcode, and wherein verifying the passcode comprises checking that the passcode was received within a time limit associated with the passcode.

6. A computerized method for providing a derived credential to a target device, the method comprising:

by one or more hardware processors executing computing instructions:

receiving a request, over a computer network, for generating a derived credential from a common access card or personal identity verification (CAC/PIV) enabled device;

receiving a CAC/PIV certificate associated with a user over the computer network from the CAC/PIV enabled device, the CAC/PIV certificate comprising a first public key and a user identifier associated with the user;

authenticating the user by validating the CAC/PIV certificate against a certificate chain and a revocation list;

storing the CAC/PIV certificate, or a public key associated with the CAC/PIV certificate, in an enterprise data store in an entry associated with the user in the enterprise data store, the enterprise data store comprising identity information for the user and other users associated with an enterprise;

issuing to the user a passcode over the computer network, wherein the passcode is associated with the CAC/PIV certificate or the user, and wherein the passcode is a one-time-use passcode or a time limited passcode;

receiving the passcode from a target device, the target device being distinct from the CAC/PIV enabled device, the target device not having a CAC/PIV card reader;

verifying the passcode as associated with the CAC/PIV certificate or the user;

generating a second private key and a corresponding second public key, the second public key distinct from the first public key;

associating the second public key with the user identifier in the CAC/PIV certificate;

associating the second public key with the expiration date of the CAC/PIV certificate;

generating a certificate signing request based on the second public key and associated data;

submitting the certificate signing request to a certificate authority;

receive from the certificate authority a signed derived credential certificate for the user identifier with an expiration date equal to the expiration date of the CAC/PIV certificate; and transmitting to the target device the derived credential certificate for storage by the target device and future derived credential-based authentication.

7. The computerized method of claim 6, wherein the signed derived credential certificated is a signed X.509 certificate.

8. The computerized method of claim 6, wherein the target is configured to store the derived credential certificate in a trusted platform module of the target device.

9. The computerized method of claim 6, wherein the passcode is a one-time-use passcode, and wherein verifying the passcode comprises checking that the passcode has not been received before.

10. The computerized method of claim 6, wherein the passcode is a time limited passcode, and wherein verifying the passcode comprises checking that the passcode was received within a time limit associated with the passcode.

11. A computing appliance for validation of a derived credential, the system comprising:

one or more processors;

a computer-readable memory; and an authentication program comprising executable instructions stored in the computer-readable memory, wherein the executable instructions direct the one or more processors to at least:

receive an authentication request from a computing device, the computing device not enabled to read a common access card or personal identity verification card (CAC/PIV card);

receive a derived credential certificate from the computing device, wherein the derived credential certificate is a credential distinct and derived from a first CAC/PIV certificate accessible from the CAC/PIV card, wherein the derived credential certificate includes a common name that matches a common name of the first CAC/PIV certificate and an expiration date that matches an expiration date of the first CAC/PIV certificate;

validate the derived credential certificate based on a trusted certificate chain and a certificate authority signature;

validate that the derived credential certificate has not expired;

validate that the derived credential certificate has not been revoked;

verify that a user identifier associated with the common name of the derived credential exists in an enterprise data store;

retrieve the first CAC/PIV certificate from the enterprise data store, wherein the first CAC/PIV certificate that is associated with the user identifier;

verify that the first CAC/PIV certificate has not been revoked; and in response to successful verification of the first CAC/PIV certificate and derived credential certificate, issue a single-sign-on token to the computing device that is configured to be used to access a network resource.

12. The computing appliance of claim 11, wherein the derived credential certificate is a signed X.509 certificate.

13. The computing appliance of claim 11, wherein validating that the derived credential certificate has not been revoked comprises checking a certificate revocation list.

14. The computing appliance of claim 11, wherein the enterprise data store comprises an active directory or a SQL database.

15. The computing appliance of claim 11, wherein the executable instructions further comprise requesting the computing device to provide one or more additional authentication factors associated with the common name of the derived credential.

16. A computerized method for validation of a derived credential, the method comprising:

by one or more hardware processors executing computing instructions:

receiving an authentication request from a computing device, the computing device not enabled to read a common access card or personal identity verification card (CAC/PIV card);

receiving a derived credential certificate from the computing device, wherein the derived credential certificate is a credential distinct and derived from a first CAC/PIV certificate accessible from the CAC/PIV card, wherein the derived credential certificate includes a common name that matches a common name of the first CAC/PIV certificate and an expiration date that matches an expiration date of the first CAC/PIV certificate;

validating the derived credential certificate based on a trusted certificate chain and a certificate authority signature;

validating that the derived credential certificate has not expired;

validating that the derived credential certificate has not been revoked;

verifying that a user identifier associated with the common name of the derived credential exists in an enterprise data store;

retrieving the first CAC/PIV certificate from the enterprise data store, wherein the first CAC/PIV certificate that is associated with the user identifier;

verifying that the first CAC/PIV certificate has not been revoked; and in response to successful verification of the first CAC/PIV certificate and derived credential certificate, issuing a single-sign-on token to the computing device that is configured to be used to access a network resource.

17. The computerized method of claim 16, wherein the derived credential certificate is a signed X.509 certificate.

18. The computerized method of claim 16, wherein validating that the derived credential certificate has not been revoked comprises checking a certificate revocation list.

19. The computerized method of claim 16, wherein the enterprise data store comprises an active directory or a SQL database.

20. The computerized method of claim 16, wherein the method further comprises requesting the computing device to provide one or more additional authentication factors associated with the common name of the derived credential.

* * * * *

UNITED STATES PATENT AND TRADEMARK OFFICE
CERTIFICATE OF CORRECTION

PATENT NO. : 9,736,145 B1
APPLICATION NO. : 14/815699
DATED : August 15, 2017
INVENTOR(S) : Chris Hayes It is certified that error appears in the above-identified patent and that said Letters Patent is hereby corrected as shown below:

In the Specification

In Column 1, Line 18, after "("HSPD-12")" insert --,--.

In Column 1, Line 49, change ""CAC/P1V-like"" to --"CAC/PIV-like"--.

In the Claims

In Column 16, Line 67, in Claim 11, before "is" delete "that".

In Column 18, Line 15 (Approx.), in Claim 16, before "is" delete "that".

Signed and Sealed this
Sixth Day of March, 2018

Andrei Iancu
*Director of the United States Patent and Trademark Office*